United States Patent

Epstein et al.

[15] 3,646,257

[45] Feb. 29, 1972

[54] COMMUNICATION SYSTEM HAVING PLURAL CODING VOCABULARIES

[72] Inventors: Paul Epstein, Brookline; James Cunningham, Cambridge; Robert E. Wernikoff, Belmont; George Rosen, Brookline, all of Mass.

[73] Assignee: Electronic Image Systems Corporation, Cambridge, Mass.

[22] Filed: Mar. 13, 1969

[21] Appl. No.: 806,810

[52] U.S. Cl...........................178/6, 178/DIG. 3, 178/DIG. 6, 340/146.3 AH

[51] Int. Cl.......................H04n 1/04, H04n 1/32, H04n 1/38

[58] Field of Search............................178/6, DIG. 3, DIG. 6; 340/146.3 AH

[56] References Cited

UNITED STATES PATENTS 2,978,535 4/1961 Brown..............................178/DIG. 3

3,189,873 6/1965 Rabinow............................340/146.3

3,204,026 8/1965 Doundoulakis...................178/DIG. 3

3,347,981 10/1967 Kagan..............................178/DIG. 3

3,459,888 8/1969 Sokolov............................178/DIG. 6

3,510,576 5/1970 Centanni..................................178/6

*Primary Examiner*—Howard W. Britton

*Attorney*—Russell L. Root and Rines and Rines

[57] ABSTRACT

A system for providing differently coded signals to represent respective different types of information such as the indicia and margin portions of a document. As a result of successive line scans of the document a sequence of message symbols is generated for each line scan in which each sequence is differently coded to respectively represent areas of different nature along the scan line. Typically the areas of different nature are margin and indicia portions of the document. The scanning of the margin areas of the document can be selectively controlled to minimize coding of areas of margin information.

19 Claims, 4 Drawing Figures

Patented Feb. 29, 1972 3,646,257

3 Sheets-Sheet 3

COMMUNICATION SYSTEM HAVING PLURAL CODING VOCABULARIES

BACKGROUND OF THE INVENTION

The invention relates to a system for communicating information in coded form, and more particularly to a method of, and apparatus for, efficiently coding successive sequences of message symbols derived from information to be communicated.

It is well established that most sequences of message symbols derived from the physical world exhibit internal regularities rendering them redundant to some degree. By taking advantage of such redundancy, and by employing an appropriate coding strategy to unambiguously represent the sequence of message symbols with a sequence of code symbols, it is possible to achieve large reductions, sometimes enormous reductions, in the number of code symbols required to represent the sequence of message symbols. Because of the resultant economies, both in storage and in communication applications, which such a code symbol sequence permits, many different coding strategies have been devised, each in an attempt to more succinctly represent a sequence of message symbols.

In some sequences of message symbols certain groups of symbols will be found to occur more frequently than other groups. For such sequences, a common coding strategy employs a vocabulary constructed of code words of different lengths, or having different numbers of code symbols, and uses the shorter code words to represent the more frequently occurring groups of message symbols. However, since each code word must always be separable in the sequence of code symbols, the code symbol permutations available to construct any given length code word are limited. This inherent limitation in turn restricts the efficiency of the coding strategy.

Other sequences of message symbols either fail to exhibit a statistical preference for any group of symbols, or are not known in advance to exhibit any given statistical preference. For this type of sequence, a common coding strategy employs a code word vocabulary in which the code words all have the same length, or the same number of code symbols. If synchronizing information is included to periodically identify the beginning of a code word, the code words can be separated simply by grouping the code symbols into words of the right length, and all code symbol permutations of this length are available in the useable code word vocabulary. While this coding strategy avoids the limitations inherent in using code words of different lengths, it does require that the code word length be chosen wisely. If the chosen code word length is not suited to the message sequence to be coded, then the coding process can result in more code symbols than there were message symbols in the original sequence. For example, if most groups in the message sequence include only a few symbols and a coding vocabulary of long code words is used, the coding strategy will be quite inefficient for this message sequence for an adequate code word vocabulary could have been constructed using a short code word; similarly, the message sequence includes many long groups of identical message symbols and a vocabulary of short code words is used, then either the coding strategy will not be able to represent, or will have to use many short code words to represent, each long group of message symbols.

Typical sequences of message symbols include some groups most economically represented by short code words and other groups most economically represented by long code words. For this reason, any coding strategy which uses a fixed length code word inherently reflects a compromise which is unsatisfactory to at least some degree. As an example of this, consider a facsimile system in which the information on a document is communicated by (1) scanning or otherwise sensing the information at the sequentially displaced regions, or elemental areas, of the document to produce a corresponding sequence of message symbols, (2) coding each sequence of counting each successive group of identical message symbols and representing each successive total with an associated fixed length code word (this is called run length coding), (3) transmitting the sequence of code words, (4) reconstituting the sequence of message symbols from the transmitted sequence of code words, and (5) producing a facsimile of the document from the reconstituted message symbol sequence. If a short length code word is used, a code word which will efficiently describe the shorter groups of message symbols which characterize the printed information, the system will not efficiently describe the longer groups of message symbols characterizing the blank margin areas normally occurring about the sides of the document. If a long code word is used to describe these blank margin areas, it will not efficiently describe the printed information. More specifically, consider a scan which traverses a printed line of a typical 8½ inch wide document and encounters first a blank margin area approximately one inch wide, then a printed area, then a final blank margin area. If the system is capable of resolving 100 discrete elemental areas per inch to produce 100 black or white representing message symbols per inch of scan, and if a run length coding strategy using a fixed code word length of five code symbols is used, then four code words will be required to describe in normal binary counting fashion the group of 100 identical message symbols in the initial blank margin area. If, on the other hand, a code word of seven symbols had been used, then only one code word would have been required to describe in binary fashion this group of 100 message symbols, and thirteen code symbols could have been saved. However, this long code word would require more code symbols to describe the alternating short groups of identical message symbols typical of the information bearing area. From this example, it is clear that any fixed length code word selected to describe all areas of a document must reflect a compromise between the blank and information-bearing areas, and will be increasingly less efficient as the proportion of blank area to information-bearing area, or long to short message symbol groups, varies from the proportion most efficiently represented by the selected code word length.

Among the objects of the present invention, then, is a coding strategy and system that does not use the same fixed length code word vocabulary for the different groups of message symbols which describe the marginal and the information bearing areas of a document or the like, but rather a coding strategy and system that economically describes both areas, one that takes advantage of known characteristics of the scanned document and transmits only the information absolutely necessary to produce an accurate facsimile of the scanned document.

It should be understood that while the invention will be related to the preceding example, it could have been related to many other examples and coding strategies, and should not be thought of as limited in scope because of the particular characteristics of the chosen example.

SUMMARY OF THE INVENTION

The coded communication system of the invention does not attempt to strike a compromise and transmit each sequence of message symbols using a code word of fixed length, as taught by prior systems. Rather, the present invention takes advantage of the inherent difference between the margin and information-bearing areas of a typical document by using at least two different code word vocabularies to describe these areas, one to describe the blank margin area and the other to describe the information-bearing area. In other words, the invention includes means for coding the first group of message symbols in each sequence of message symbols, such as may represent the blank margin area of the document, using a code word or words selected from a first code word vocabulary, and for coding subsequent groups of message symbols in each sequence, such as many represent the information-bearing area of the document, using a code word or words selected from a second code word vocabulary, one preferably chosen to economically represent the groups of message symbols derived from the information-bearing area of the document. Preferably the first code word vocabulary includes sufficient code words to describe all possible groups of message symbols in a sequence of message symbols derived by scanning across a document, including a sequence in which all the message symbols but the last are identical. Also, preferably the coded description of the last group of identical message symbols is omitted, for his will normally be the blank right-hand margin area, and in any event because it is the last group, the number of message symbols it includes can be deduced by subtracting the number of message symbols described by the preceding code words in the sequence from the number required to describe a complete scan line sequence.

BRIEF DESCRIPTION OF THE DRAWINGS

Preferred embodiments of the invention will be described in connection with the accompanying drawings in which.

DESCRIPTION OF THE FIG. 1 CODING SYSTEM

Figure 1:
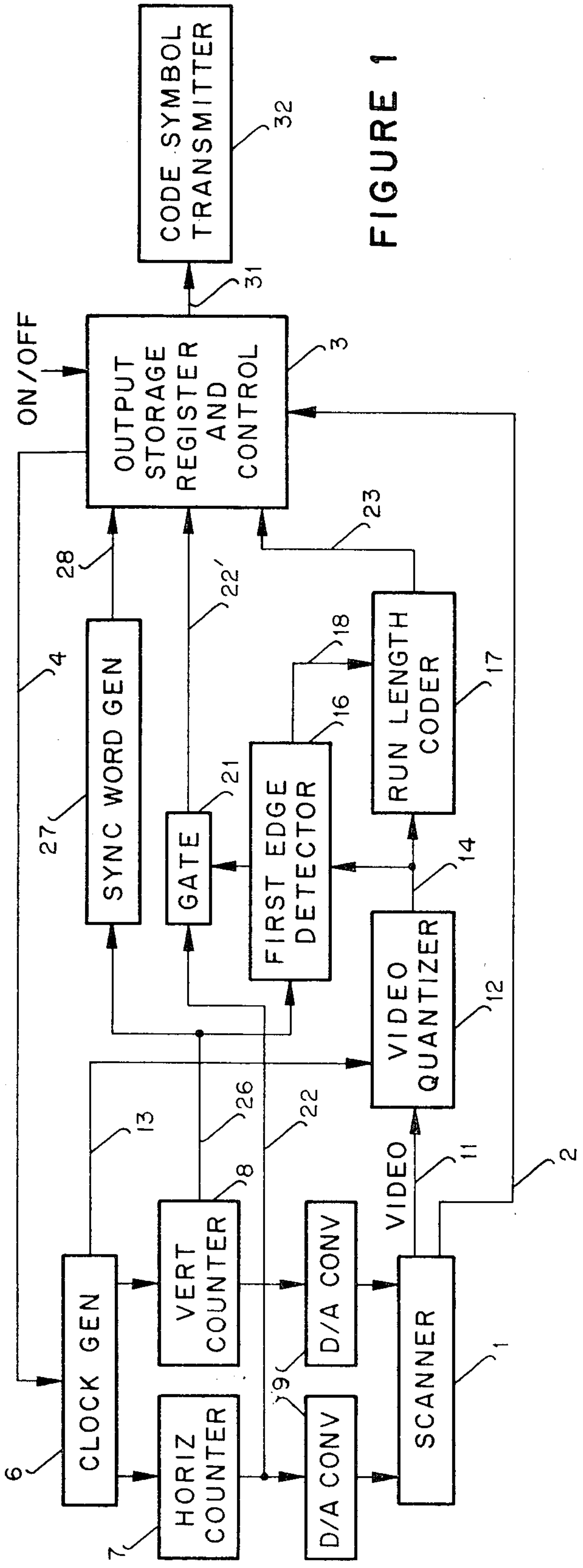
FIG. 1 is a block diagram of a system for generating and coding sequences of message symbols.

To code a document for a transmission using the coding system shown in FIG. 1, assuming appropriate levels of power are supplied to all components of the system, and that the components have been cleared or reset as appropriate, the document is positioned to be sensed and scanned by a scanner 1. Upon sensing the document, by an appropriate switch for example, the scanner 1 sends a signal over an electrical interconnection 2 (hereafter termed a line) to an output storage register and control circuit 3. In response to this signal, the control circuit supplies a control signal over a line 4 to a clock generator 6 causing the clock generator to produce a series of pulses. These pulses are supplied to a horizontal counter 7 and a vertical counter 8, which counters in turn produce binary numbers presenting the instantaneous totals of the pulses in a cyclic fashion, the horizontal counter total cycling at a first rate and the vertical counter advancing in step with the cycles of the horizontal counter and cycling at a second, slower rate. The instantaneous totals at the counters are converted by respective digital to analog (D/A) converters 9 into analog scan signals whose amplitudes are directly related to the totals. These analog signals are supplied to the scanner 1, and cause the scanner in response to the horizontal scan signal to sense and translate the black or white brightness values of the elemental areas along each horizontal scan line across the document into a video waveform, successive scan lines covering the entire document in a vertical fashion in response to the vertical scan signal.

The generated video waveform is supplied over a line 11 to a video quantizer 12. The video quantizer shapes the video waveform into a quantized waveform consisting of a sequence of pulses related to the brightness values of the sequence of elemental areas scanned. Each pulse has one of two amplitude levels which respectively represent the black and white brillance values of associated elemental areas on the document. To maintain synchronism of the quantized pulses with the advance of the horizontal scan across the document, a signal is supplied from the clock generator 6 over a line 13.

The sequence of quantized pulses, or message symbols, produced by the video quantizer are supplied over a line 14 to a first edge detector circuit 16 and to a run length coding circuit 17. At the start of each horizontal scan, the first edge detector supplies a signal over a line 18 to the run length coder to block its reception of message symbols. As the scanner begins each horizontal scan line, the first group of successive, identical message symbols produced by the video quantizer will represent the margin area of the document. The pulse of different amplitude level following this first group of pulses will correspond to the leading edge of the first mark of information along the scan line. Upon reception of this first edge pulse, the first edge detector 16 removes the blocking signal from line 18 to permit the run length coder to run length code successive groups of identical message symbols using a particular code word vocabulary, preferably one in which the code words each have an identical number of symbols. Upon receipt of the first edge pulse, the first edge detector also supplies a signal to open a gate 21. This permits the binary total then existing in the horizontal counter, which total describes the position of the first edge along the scan line, to pass over a line 22, through the open gate 21, and over line 22, to the output storage register 3, where it is stored for transmission as the first edge code word. Thus the code vocabulary used to describe the first edge includes all the code words, or binary totals, occurring in a complete cycle of the horizontal counter.

Since the run length coder 17 has been unblocked by the first edge detector upon the receipt of the first edge pulse, it is now free to code successive groups of identical message symbols, or pulses, received from the video quantizer. It does this, and produces a series of code words of identical symbol count, or fixed length, selected from a second code word vocabulary, each code word corresponding to the length of a group of identical message symbols. This second code word vocabulary preferably is selected according to the density of information encountered during the scan, as taught in Wernikoff et al. U.S. Pat. No. 3,394,352 to minimize the number of code symbols required to describe the sequence of message symbols, and includes a null code, or uncoded, capability so that no scan line sequence of message symbols will ever result in a longer sequence of code symbols than message symbols.

The code words produced by the run length coder 17 are supplied over a line 23 to the output storage register 3, which stores them for sequential transmission following the first edge code word. After completing the horizontal scan, and during each retrace interval between scan lines, the vertical counter receives a pulse from the clock generator to advance its count by one and to increment the horizontal scan vertically along the document. This pulse, or a derived pulse, is supplied by the vertical counter along a line 26 to the first edge detector 16 and to a synchronizing word generator 27. It causes the first edge detector to blank the run length coder and to begin examining subsequent message symbols for the first edge, as previously described. It also causes the synchronizing word generator 27 to produce a uniquely decipherable code word which is supplied to the output storage register 3 over a line 28 as a synchronizing code word. Thus for each scan, there is entered in the output register 3 first a synchronizing code word, then the first edge code word, then successive run length code words describing successive groups of identical message symbols. If the code actually used for each scan is selected according to the density of information encountered during the scan, as taught in the previously cited Wernikoff et al. patent, a mode word designating the code employed may be added following each synchronizing code word. The sequence of code words for each scan are supplied over a line 31 to a code transmitter 32 which transmits successive code symbols in any convenient fashion, such as over telephone lines.

The desireability of using a first code word vocabulary to describe the first run length, or the blank margin area of the documents, and a second code word vocabulary to describe subsequent run lengths, or the information-bearing area of the document, has been discussed. Suffice it to again note here that if the first code word vocabulary is the binary number representing the horizontal position of the scanner along the line, then a code consisting of only one word will be required to describe any position along the line. For a completely blank line, of course, the end of the first white run would coincide with the end of the page. Thus the first code word, if sent at all, would describe the entire scan line. By convention, when a blank line is encountered the first edge code word may be omitted, and the resultant succession of synchronizing words interpreted by the receiver as a corresponding succession of blank lines.

Since the number of code symbols produced by the system are directly related to the amount of information on the document, and since the code symbols preferably are always available for transmission and are sent at a fixed, constant rate by the transmitter while the information encountered during the scanning action will occur at a varying rate, the reservoir of code symbols in the output storage register will vary with the amount of information, or number of edges, encountered during each scan. If a blank area is being scanned, relatively few code symbols will be supplied to the storage register and its reservoir will tend to empty; if the information area being scanned contains many alternating black and white segments, many code symbols will be supplied to the storage register and it will tend to overflow. To prevent either emptying or overflow of the register, it is desirable to regulate the scanning action according to the amount of information encountered. One way to accomplish this regulation is to provide a storage register large enough to accept the maximum number of symbols which may possibly be produced during one scan, and to only supply a control signal over line 4 to initiate another scan when the register is empty enough to accept the sequence of symbols produced during this next scan. Another way to accomplish this regulation without using a large storage register is to dynamically adjust the scanning rate, at least in a coarse fashion, in response to the reservoir of code symbols in the storage register. This dynamic regulation may be accomplished as follows: the control circuit associated with the storage register continuously monitors the reservoir of code symbols, and when the reservoir departs from a normal range, supplies an appropriate signal to the clock generator 6 to alter the rate at which the clock generator produces and feeds pulses to the horizontal and vertical control circuits. If the reservoir is emptying, the clock generator is speeded up to produce pulses at a faster rate; if the reservoir is almost filled, the clock generator is retarded to produce pulses at a slower rate. This in turn varies the speed of the scanner, to cause either a greater number or a lesser number of code symbols to be produced, as required to maintain an adequate reservoir of symbols in the storage register. Rather than varying the clock pulse frequency, bursts of clock pulses at a constant frequency may be supplied to advance the scanner, the duration of each burst and the extent of each advance being determined by the reservoir of symbols in the storage register.

DESCRIPTION OF THE FIG. 2 MODIFICATION

Figure 2:
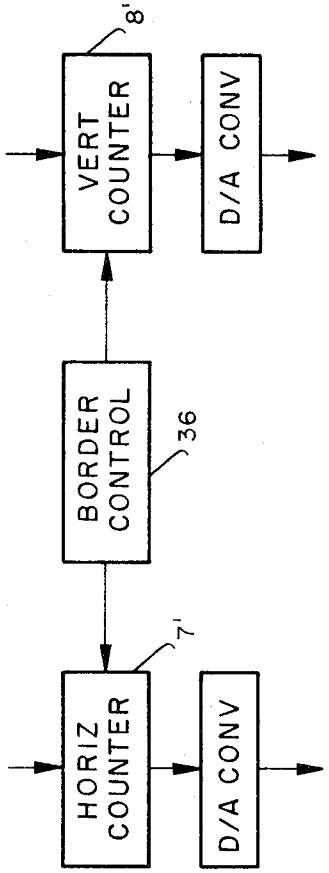
FIG. 2 is a block diagram of a modification which may be employed in the system shown in FIG. 1.

In operation, the coding system shown in FIG. 1 will scan and code the document from edge to edge, and from top to bottom. This can be inefficient if the document has wide margin areas, or if certain border information (such as the heading) on the document is already known and needn't be sent. The coding system of FIG. 1 can be readily modified as shown in FIG. 2 to automatically avoid scanning whatever border portion of the document it is desired to omit. To accomplish this, a border control circuit 36 is connected to both the horizontal counter 7′ and the vertical counter 8′. The border control circuit selectively controls the count of each of these counters by presetting the beginning count and limiting the maximum count. For example, if it is desired to omit the left hand vertical margin area of the document, the border control circuit 36 is so adjusted that the binary total of the horizontal counter is automatically preset at the beginning of each line by the border control circuit to a binary total sufficient to begin each horizontal scan at a point just to the right of the omitted margin area. As a result, the scan will not traverse the bulk of the left-hand margin, and any information in it will be omitted. Since this effectively supplants the need for the first edge code word, the first edge detector may be disabled by activation of the border control circuit if desired. In a similar fashion, the border control circuit may be adjusted to preset the maximum total of the horizontal counter to omit the right-hand vertical margin area. The beginning and ending total of vertical counter also may be preset by the border control circuit 36 to omit any desired area on the top and bottom of the document, or automatically adjusted as the document is being scanned to succinctly describe the horizontal margin area first encountered and to omit any description of the concluding margin area.

DESCRIPTION OF THE FIG. 3 DECODING SYSTEM

Figure 3:
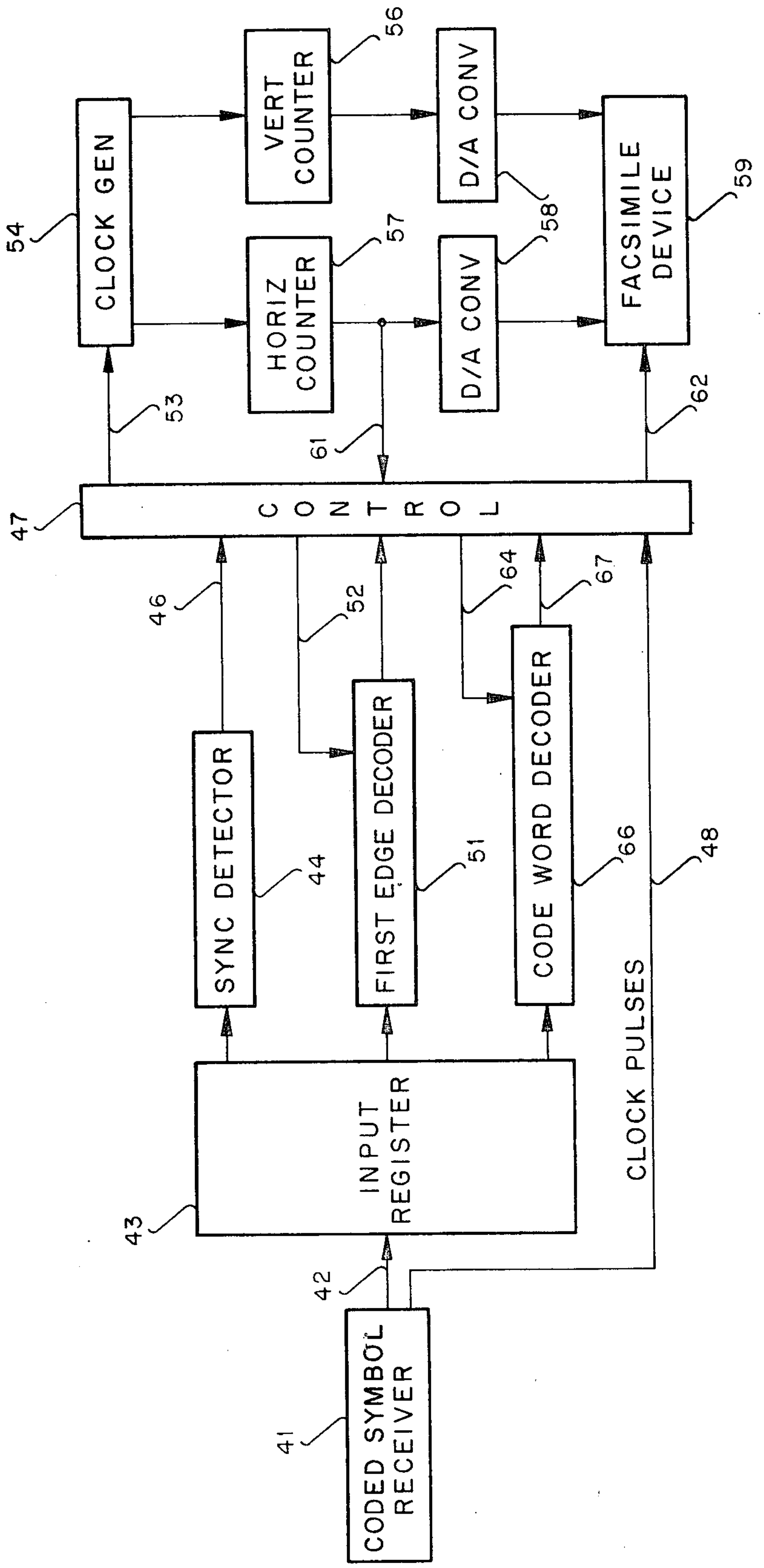
FIG. 3 is a block diagram of a system for receiving and decoding sequences of code symbols to reconstitute message symbols, and for producing a facsimile using these reconstituted message symbols.

A decoding system such as shown in FIG. 3 may be used to convert the code symbols transmitted by the coding system of FIG. 1 into a facsimile of the scanned document. The transmitted code symbols are received by a code symbol receiver 41 and supplied over a line 42 to an input register 43, where they are stored and supplied as demanded on appropriate output lines. A synchronizing code word detector 44 is connected to the input register 43 and continuously searches the sequence of pulses stored in the input register for the synchronizing code word. When the synchronizing code word detector finds a synchronizing code word, it supplies a pulse over a line 46 to a control circuit 47. In response, the control circuit overrides any other indication and pauses while sufficient additional code symbols are received to shift the synchronizing code word from the input register, the occurrence of successive code symbols being signalled to the control circuit by clock pulses supplied by the receiver over a line 48, as is conventional. When sufficient code symbols have been received to constitute the next code word in the input register, the control circuit activates the first edge decoder 51 over a line 52, causing the decoder to read and store this next code word, which is the first edge code word.

Upon receipt of the synchronizing code word, the control circuit 47 also supplies a signal over a line 53 to a clock generator 54. In response, the clock generator supplies a pulse to a vertical counter 56 and begins supplying pulses to a horizontal counter 57. The frequency of these pulses may be synchronized to the frequency of the pulses constituting the synchronizing code word if desired. As in the coding system, the totals of the horizontal and vertical counters are supplied to respective D/A converters 58, which circuits in turn convert these digital numbers to analog voltages of a corresponding value. The analog voltages are supplied to a facsimile device 59. The facsimile device may employ a cathode ray tube to display a transient visible facsimile of the original document scanned by the coding system; preferably though the facsimile device produces a permanent record or hard copy of the original document by, for example, exposing a photosensitive sheet to a controlled light source thereby reconstituting in a line-by-line fashion the intensity of the scanning light beam as reflected from the original document, to produce a facsimile. Mechanisms for accomplishing this are known. The vertical and horizontal analog sweep signals produces by the converters 58 advance the scanning light beam of the facsimile device vertically from line to line in response to the synchronizing signals, and cause it to horizontally sweep the light beam across a photosensitive sheet.

As the total of the horizontal counter increases on receipt of successive pulses from the clock generator, the instantaneous total is supplied over a line 61 to the control circuit 47. The control circuit continuously compares this instantaneous total with the first edge code word stored in the first edge decoder 51. When the ascending total of the counter matches the first edge code word, indicating that the facsimile device has reached the position of the first edge on the scanned document, this coincidence is detected by the control circuit and causes the signal on line 53 to be removed, the clock generator to stop supplying pulses to the counters, and the sweep signals to hold the scanning light beam of the facsimile device at the first edge position.

The control circuit supplies a video brightness signal to the facsimile device over a line 62. By convention, each line is assumed to begin with a white run length, and the run lengths following it always alternate in color. The control circuit does this bookkeeping, supplying a white video color signal to the facsimile device for the first run length or margin area, and alternating colors for subsequent run lengths along each line.

As the code symbols following the first edge code word are received, they are entered in sequence in the input register. When sufficient code symbols have been received to shift the first edge code word from the input register, as signalled to the control circuit by the clock pulses supplied over line 48, the control circuit supplies a command signal over a line 64 to a code word decoder 66. The command signal causes the code word decoder to read and store the group of code symbols now in the input register which constitute the run length code word following the first edge code word. After changing the video color signal on line 62, the control circuit again supplies a signal to the clock generator 54 to cause it to resume supplying pulses to the horizontal counter 57. Each pulse supplied to the counter is sensed and totalled by the control circuit, by for example sensing over line 61 each new total of the horizontal counter. When the beam of the facsimile device has advanced from the first edge a run length equal to that designated by the code word stored in the control circuit, the total accumulated by the counter will match the run length represented by the stored code word. The control circuit then pauses until sufficient code symbols have been received, as signalled by the clock pulses, to shift the first run length code word out of the input register and the next run length code word into position to be decoded by the code word decoder. As previously, the control circuit causes the next word to be decoded and stored, then changes the video color signal on line 62 and causes the clock generator to advance the horizontal counter and the scanning beam of the facsimile device until its advance corresponds to the run length represented by the stored code word.

This sequence is repeated for each code word until the next synchronizing code word is detected by the synchronizing code word detector. When this occurs, the control circuit advances the facsimile device to the next line, then reconstitutes it in a similar fashion to the line just described. In this manner, the facsimile device reconstitutes the scanned document, run length by run length, and produces a hard copy facsimile of the document originally scanned. If the portion of the line following the first run length, or margin area, has been transmitted using a null code, i.e., uncoded, as indicated for example by an appropriate mode word following the synchronizing word, then the control circuitry will advance the scanning beam of the facsimile device one step for each symbol received, and adjust the video color signal on line 62 according to the color represented by the received symbol.

Rather than entering the first edge code word in the control circuit, then advancing the facsimile device until the first edge is reached, the first edge code word may be entered directly into the horizontal counter by the control circuit if desired, to instantly advance the facsimile device to the first edge. In this modification, because of the instantaneous advance of the scanning beam to the first edge, if a true copy of the original document is desired it is preferable to use a negative to positive color reversal facsimile process, one in which exposure to light results in a dark area, and avoid the problems in a nonreversing process associated with obtaining sufficient exposure of the copy to produce a white area during this instantaneous advance to the first edge. This will also permit the receiver to terminate operation at the last edge and move directly to the next line without first filling out the remainder of the previous line.

DESCRIPTION OF THE FIG. 4 MODIFIED CODING SYSTEM

A basic characteristic of the invention is the provision of at least two coding vocabularies, one to code a first group of message symbols in each line or other sequence, the other vocabulary to describe subsequent groups of message symbols in each sequence. In the system shown in FIG. 1, for documents with appreciable left hand margins this results in efficient coding of the margin (assuming that the scanning beam travels from left to right). Of course, documents having appreciable left hand margins are also likely to have appreciable right-hand margins. It would be desirable to efficiently code this margin area too. In that way, each distinct portion of each scan line will be efficiently coded, resulting in an efficiently coded representation of the scanned document. While the right-hand margin could be coded employing the vocabulary used for the left hand margin, since the right-hand margin is the last run length of the scan line, whose length is known or predetermined, the length of the right-hand margin can be deduced from the total of the preceding lengths, and actually need not be coded. A system for detecting the last group of identical message symbols in each scan line, which will be the symbols representing the right hand margin, and for omitting the coded description of this last group of symbols from the coded communication, is shown in FIG. 4.

Figure 4:
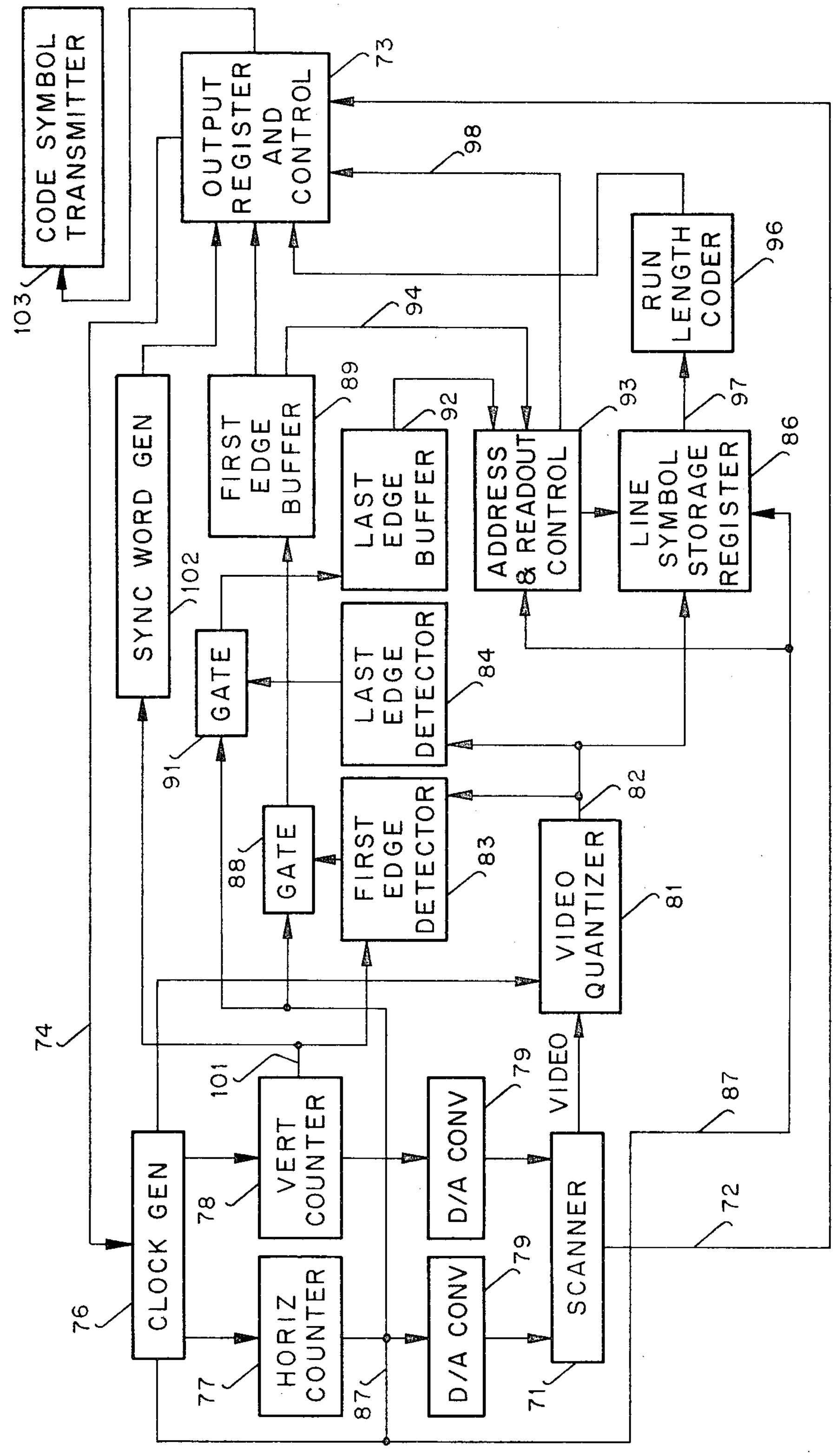
FIG. 4 is a block diagram of another system for generating and coding sequences of message symbols.

The coding system of FIG. 4 is generally similar in operation to the system shown in FIG. 1. It includes a scanner 71, which upon sensing a document to be communicated, sends a signal over a line 72 to an output register and control circuit 73. In response, the control circuit supplies a control signal over a line 74 to a clock generator 76 causing the generator to produce pulses at a first rate. These pulses are supplied to a horizontal counter 77 and to a vertical counter 78, which counters total the pulses in a cyclic fashion. Binary numbers representing the totals are supplied to D/A converter circuits 79. The analog sweep signals produced by these converters are supplied to the scanner 71 causing it to scan the sensed document both horizontally and vertically and produce video signals representing the black or white brilliance of each elemental area along each scan line. These video signals are supplied to a video quantizer 81, which as in the FIG. 1 circuit produces a sequence of quantized video pulses, or message symbols, in synchronism with advancement of the horizontal scan, each pulse having one of two amplitude levels corresponding to the black or white brilliance of a corresponding elemental area on the document. This sequence of message symbol is supplied over a line 82 to a first edge detector 83, to a last edge detector 84, and to a line symbol storage register 86. The latter is sufficient to store the sequence of message symbols representing one complete scan line, the message symbols being automatically entered into the register at predetermined positions corresponding to their positions in the sequence and scan line, the position in each case being indicated by the instantaneous value conveyed to the register over a line 87.

As the line is being scanned, and the symbols are being stored in sequence in the line symbol storage register, the first edge detector operates as previously described to sense the first group of successive identical message pulses, representing the margin. When the pulse of the opposite amplitude level following this first group is sensed by the first edge detector, it opens a gate 88 which passes the total then present in the horizontal counter and existing on line 87 to a first edge buffer 89, a circuit which both stores this total and enters it in the output register 73. The last edge detector 84 operates in a similar fashion, except that it opens a gate 91 when a pulse of amplitude level of the preceding pulse occurs. Each time gate 91 is opened, it jams the total then present in the horizontal counter and existing on line 87 into a last edge buffer 97, which stores this new total. Thus, at the end of the scan line the first edge buffer 89 will contain the instantaneous total of the horizontal counter which corresponds to the position of the first edge encountered along the scan line, and the last edge buffer 92 will contain the instantaneous total of the horizontal counter at the last edge encountered along the scan line.

If the receiver terminates reproduction of a line on occurrence of the last edge, as is preferred, then to ensure that a black margin area will be reproduced, at least one white representing message symbol is added at the end of each scan line and the last edge detector is set to respond only to black-to-white representing transitions in the message symbol sequence. As a result, should the trailing margin area of the scan line be black, then the added white representing message symbol will cause the last black to white transition, or edge, to occur at the end of the scan line, and this total to be stored in the last edge buffer and the scan line reproduced to this edge by the receiver. On the other hand, if the trailing margin area is white, then the added white representing message symbol will not alter the total stored in the last edge buffer.

The clock generator monitors the instantaneous total of the horizontal counter on line 87 and, when a maximum count is reached, representing completion of the scan line, stops supplying pulses to the counter and by an appropriate signal notifies an address and readout control circuit 93. In response, the address and readout control circuit then senses the first edge total stored in the buffer 89, as signaled over a line 94. Since this total has already been entered as the first code word in the output register, the readout control circuit supplies pulses to the storage register to feed the message symbols stored in register 86 following the first edge into a run length coder 96 over a line 97. These message symbols are run length coded, using a predetermined code vocabulary, preferably composed of identical length code words, and successive code words are entered and stored in the output register and control circuit 73 in order after the first edge code word. The address and readout control circuit also senses the last edge total stored in the last edge buffer 92. When this position is reached in the line storage register, the readout control circuit stops reading message symbols into the run length coder and signals completion of the coding process to the output register and control circuit over a line 98, then clears the line symbol storage register for storage of the next scan line, or the next sequence of message symbols. When the output register and control circuit 73 receives the completion of coding signal on line 98, it signals the clock generator over a line 74 to initiate scanning of the next line of the document by supplying a pulse to the vertical counter 78 then a sequence of pulses to the horizontal counter 77. If vertical advancement is relatively slow, as is true in some scanning systems, then to allow the maximum amount of time for this action vertical advancement may be initiated on completion of each horizontal scan without waiting for a completion of coding signal. Each advance of the vertical counter is signaled over a line 101 to a synchronizing code word generator 102 and to the first edge detector 83. This signal resets the first edge detector and causes the synchronizing code word generator to produce and enter a synchronizing code word in the output register and control circuit 73. Thus, for each scan line the output register and control circuit produces a synchronizing code word, then a first edge code word, then a series of run length code words. They are entered in sequence and serially at a constant rate to a code symbol transmitter 103, which transmits the code symbols sequentially and continuously without interruption during the communication. They may be received by the decoding system shown in FIG. 3, which will decode them and produce a facsimile of the scanned document, operating as previously described.

It will be noted that the system of FIG. 4 can employ a constant rate horizontal scanner, such as a rotating cylinder with reflective facets, if desired, while the system of FIG. 1 may use a variable speed scanner, such as the cathode ray tube. This is because the system of FIG. 4 stores the message symbols produced by each scan line, and therefore can operate on them at a rate independent of the horizontal scanning rate. If the system of FIG. 1 includes an output storage register insufficient to store the sequence of message symbols describing a complete scan line, then it must vary the scanning rate in accordance with processing of the message symbols by the run length coder. Of course, each system could be modified to use or not use message symbol storage and fixed or variable horizontal scanning, as desired. The vertical scanning rate in both coding systems in variable, because on most all documents the horizontal scanning action will encounter areas bearing little or no information and areas bearing dense information. These different areas will produce quite different quantities of code symbols, corresponding directly to the density of the information encountered. Since the code symbols preferably are communicated at a fixed rate by the code symbol transmitter, it is necessary to vary the vertical scanning rate in accordance with the information encountered to maintain a adequate supply of code symbols in the output storage register which supplies the transmitter.

All the coding and decoding circuits have been illustrated as being separate. However, since these circuits use many of the same components, and since a two-way communication capability is preferred for most applications, advantageously the coding and decoding circuits can be combined in a transceiver. While this combination would be accomplished in a standard fashion by anyone skilled in the art, and therefore is not illustrated and will not be described in detail, generally the transceiver would employ a common clock pulse generator and sweep circuits, common scanning and reproduction devices, common storage circuits, and may employ common coding and decoding logic circuits.

While preferred embodiments of the coding and decoding circuits, and of the coded communication system, have been illustrated and described, since different implementations of the invention may be preferred by others, and since modifications will naturally occur to those skilled in this art, the invention is not limited to the disclosed embodiments but rather is described by the following claims.

We claim:

1. A system for coding sequences of message symbols generated by repetitively scanning a scene, a sequence of message symbols being generated during each scan, the coding system including means to convert each successive group of message symbols in each sequence into a coded description consisting of a sequence of code words representing the sequence of message symbols, means to detect the last group of message symbols in each sequence, and means connected to the detection means and to the conversion means for omitting the coded description representative of the last group of message symbols in each code symbol sequence.

2. A method of coding sequences of message symbols, each sequence having a predetermined length, including the steps of converting each successive group of message symbols in each sequence into a representative code word to produce a sequence of code words representative of the message symbols, detecting the last group of message symbols in each sequence, and omitting the code word representative of last group of message symbols in each sequence from the sequence of code words.

3. A system for transmitting pulses representative of information having a first color value on a document of a second color value background including:

- scanning means for sensing the color of elemental areas about the document and for producing a video signal whose value varies with the sensed color value;
- means for generating a binary total which cycles from a low to a high value;
- horizontal deflection means for causing the scanning means to successively sense the color value of adjacent ones of said elemental areas in scan paths across the document, the position of each said sensed elemental area in each said scan path corresponding to a particular binary total;
- vertical deflection means for providing parallel spacing of the scan paths and causing the scanning means to cover a generally rectangular area of the document;

means for quantizing the video signal produced by the scanning means and for producing successive sequences of pulses, each pulse having one of two values representing the color value of a corresponding elemental area on the document, each sequence of pulses corresponding to a scan line;

means for identifying the extent of the first sequential pulses in each sequence having predetermined similar values and for producing a first signal in response to the pulse following said extent of first sequential pulses;

means for transmitting pulses;

means for gating the instantaneous binary total present in said means for generating a binary total to the transmitter means in response to the first signal;

means for coding the pulses in each sequence of quantized video pulses following said first extent of pulses and for producing a series of code pulses representative of the quantized pulses following said first extent of pulses; and means for supplying the code pulses to the transmitter means for transmission.

4. A system as set forth in 3 including means for sensing the last group of identical pulses in each sequence of quantized video pulses having a plurality of groups of pulses; and means for omitting the code pulses representative of the last group of quantized video pulses in each sequence from the transmitted sequence.

5. A system as set forth in claim 4 including storage means for the sequences of quantized video pulses;

means for selectively supplying the sequences of stored quantized video pulses to the coding means; and control means for sensing the first and last group of quantized video pulses in each sequence and for causing the selective supplying means to supply only the quantized pulses between the first and last group to the coding means.

6. A system for generating a multiply coded signal representing successive sequences of message symbols with each sequence comprising a first group of message symbols indicating information of a first nature and a second group of message symbols indicating information of a second nature, said system comprising:

means for receiving said successive sequences of message symbols;

means for identifying said first group of message symbols in each of said received sequences of message symbols;

means for encoding said first group of identified message symbols according to a first coding system to produce a first coded signal;

means for encoding said second group of received message symbols according to a second coding system to produce a second coded signal; and means for assembling said first and second coded signals to produce said multiply coded signal.

7. The system of claim 6 operative in association with a transmission channel and means for applying said multiply coded signal at one terminal of said transmission channel and for recovering said coded signal from another terminal thereof, said system further comprising:

first means for decoding portions of said recovered multiply coded signal corresponding to said first coded signal to produce a first decoded signal; and second means for decoding portions of said recovered multiply coded signal corresponding to said second coded signal to produce a second decoded signal in the same signal format as said first decoded signal.

8. A system for generating one or more sequences of differently coded electrical signals to represent brilliance characteristics of portions of an information-bearing surface, said system comprising:

means for scanning said information-bearing surface to produce a scan signal varying in accordance with brilliance characteristics of said information-bearing surface along one or more scan lines;

first means for encoding said scan signal according to a first coding system over a portion of said one or more scan lines up to a first encountered predetermined brilliance characteristic of said information-bearing surface to produce a first coded electrical signal;

second means for encoding said scan signal according to a second coding system over the portion of said one or more scan lines beginning with said first encountered predetermined brilliance characteristic on said one or more scan lines to produce a second coded electrical signal; and means for assembling said first and second coded electrical signals to produce said differently coded electrical signals.

9. The system of claim 8 wherein:

said first and second encoding means is operative to select said second coding system to provide for economy of signal in said second coded signal; and means are included for providing a mode signal as part of said differently coded electrical signals indicative of the coding system selected.

10. The system of claim 8 further including means for generating a start signal representative of the start of said one or more scan lines; and means for assembling said start signal into said differently coded electrical signals for indicating the start of said one or more scan lines.

11. The system of claim 8 wherein:

said scanning means is operative to provide said scan signal as first and second count signals respectively representative of the run length of said one or more scan lines up to said first encountered predetermined brilliance characteristic and of subsequent run lengths in each of said one or more scan lines having a similar brilliance characteristic; and said first and second encoding means are operative to encode said first and second count signals respectively into said first and second coded electrical signals in accordance with coding formats providing for efficiency of transmission.

12. The system of claim 8 further comprising:

first decoding means operative in response to said differently coded electrical signals for providing a first decoded signal corresponding to said first coded electrical signal;

second decoding means operative in response to said differently coded electrical signals for providing a second decoded signal representative of said second coded electrical signal; and reproduction means operative in response to said first and second decoded signals for producing a copy of said information-bearing surface.

13. A system for developing signals representative of brilliance characteristics on an area of a document with said area selected to exclude margin areas, said system comprising:

controllable scanning means for sensing the brilliance characteristics of elemental areas of said document to provide a scan signal, said controllable scanning means having line deflection means for causing said scanning means to sense the brilliance characteristics of said elemental areas in lines across said document and having line spacing means for causing said scanning means to sequentially scan parallel separated lines across said document to provide scanning of the surface of said document;

means for addressing the position of elemental areas scanned by said controllable scanning means;

means for selecting initial and terminal positions for scanning of said elemental areas on said document; and means for providing the addresses of said selected initial and terminal positions;

means for controlling said controllable scanning means to cause said scanning signal to commence and terminate at said addresses provided for said selected initial and terminal positions on said document; and said scanning means being thereby operable to scan a selectable area of said document within addressable limits thereon.

14. The system of claim 13 wherein:

said position addressing means provides first and second binary totals representative of the position of said elemental areas;

means are provided for repetitively cycling said first binary total between an initial and a terminal value;

means are provided for advancing said second binary total one unit from an initial to a terminal value with each repetitive cycle of said first binary total;

said selecting means provides a range of totals for said first and second binary totals in response to said selected initial and terminal positions; and said controllable scanning means is operative in response to said first and second binary totals to sense the brilliance characteristics of elemental areas represented by said binary totals within said range of totals.

15. A method for generating and economically transmitting coded signals representing a sequence of information containing message blocks arranged in a sequence of alternating message nature, said method comprising the steps of:

receiving said sequence of message blocks;

identifying the message nature of said received message blocks;

developing a first coded series of said coded signals in response to received message blocks identified as having one message nature, said developing being in accordance with a first coding system;

developing a second coded series of said coded signals in response to received message blocks identified as having the other message nature, said developing being in accordance with a second different coding system providing for economy of signal; and assembling said first and second coded series in a predetermined sequence for economical transmission.

16. The method of claim 15 further comprising the step of:

scanning an information-bearing surface in successive spaced parallel scan lines to produce said sequence of blocks of alternating message nature representative of the information of said information-bearing surface;

said message blocks of one message nature being produced in response to the extent of said scan lines corresponding to the first scanned margin portions of said information-bearing surface;

said message blocks of the other message nature being produced in response to the extent of said scan lines corresponding to a portion of said information-bearing surface scanned subsequently to said first scanned margin portions.

17. A system for coding successive sequences of message symbols generated by repetitively scanning lines across a document, the message symbols representing the black or white brightness values of successive elemental areas of the document along the scan line, each sequence consisting of a plurality of groups of message symbols with the first group of each scan line being the first message symbol of the line and all successive identical message symbols which immediately follow the first symbol, the system having, in combination;

first means to code the first group of message symbols in each sequence using code words selected from a first code word vocabulary;

second means to code subsequent groups of message symbols in each sequence using code words selected from a code word vocabulary different from the first code word vocabulary to thereby convert each sequence of message symbols into a sequence of code words;

the first code word of each sequence being selected from a different code word vocabulary than subsequent code words; and means to omit the coded description of the last group of successive identical symbols in each sequence of message symbols.

18. A method of coding a message represented by sequences of message symbols corresponding to black or white brightness value of successive elemental areas of a document along a scan line, a first group of message symbols of each scan line being the first message symbol in the scan line and all successive identical message symbols which immediately follow the first message symbol, said method comprising the steps of;

converting the first group of identical message symbols in each sequence into a coded description according to a first code word vocabulary;

converting each subsequent group of message symbols in each sequence into a coded description according to a code word vocabulary different from the first code word vocabulary; and omitting the coded description of the last group of message symbols in each sequence.

19. A system for generating and transmitting signals representative of brilliance characteristics of portions of an information-bearing surface, said system comprising:

controllable means for scanning said information-bearing surface with parallel separated scan lines to sense the brilliance characteristics of elemental areas along each said scan line and to produce a coded scan signal representative of said brilliance characteristics, said controllable means including:

means for developing said coded scan signal in response to sensed brilliance characteristics according to a first coding system over an initial margin extent of each said scan line; and means for developing said coded scan signal in response to sensed brilliance characteristics according to a second coding system over portions of each said scan line subsequent to said initial margin extent;

means for storing said coded scan signal an providing an indication of the amount of said coded scan signal stored in said storing means;

a transmission channel;

means for extracting signals stored in said storing means and applying them to said channel at a rate adapted for efficient transmission along said channel; and means for controlling said scanning means to provide scanning of each scan line in response to an indication of there being less than a predetermined amount of said coded scan signal stored in said storing means.

* * * * *

UNITED STATES PATENT AND TRADEMARK OFFICE
CERTIFICATE OF CORRECTION

PATENT NO. : 3,646,257

DATED : February 29, 1972

INVENTOR(S) : Paul Epstein et al

It is certified that error appears in the above-identified patent and that said Letters Patent are hereby corrected as shown below:

Column 8, line 49, "symbol" should read --symbols--;
line 70, --opposite to the amplitude level-- should be inserted after "level";
line 72, "97" should read --92--.

Column 10, line 8, "in" should read --is--;
line 17, "a" should read --an--.

Column 14, line 18, "value" should read --values--;
line 50, "an" should read --and--.

Signed and Sealed this

*sixth* Day of *April 1976*

[SEAL]

*Attest:*

RUTH C. MASON
*Attesting Officer*

C. MARSHALL DANN
*Commissioner of Patents and Trademarks*